United States Patent [19]

Ebert

[11] 4,007,370
[45] Feb. 8, 1977

[54] DEVICE FOR HEATING THERMOPLASTIC EYEGLASS FRAMES

[76] Inventor: Edward A. Ebert, 203 Huxley Drive, Snyder, N.Y. 14226

[22] Filed: June 3, 1974

[21] Appl. No.: 475,651

[52] U.S. Cl. .................................. 219/521; 81/3.5; 219/343; 219/354; 219/386; 432/225
[51] Int. Cl.² .......................................... H05B 3/06
[58] Field of Search .......... 219/216, 302, 342, 345, 219/346, 348, 354, 385, 386, 388, 340, 400, 411, 470, 521, 525, 527, 530; 29/20; 351/88; 81/3.5; 179/107; 34/107; 99/331, 389, 392; 432/225

[56] References Cited

UNITED STATES PATENTS

| | | | |
|---|---|---|---|
| 2,735,921 | 2/1956 | Edgerton | 219/342 X |
| 3,003,409 | 10/1961 | Mills | 99/331 |
| 3,244,859 | 4/1966 | Whiteford | 219/348 |
| 3,269,224 | 8/1966 | Magee | 81/3.5 |
| 3,329,801 | 7/1967 | Shannon et al. | 219/388 |
| 3,359,404 | 12/1967 | Limberger | 219/216 |
| 3,475,590 | 10/1969 | Pins | 219/521 X |
| 3,515,853 | 6/1970 | McAdams | 219/346 |
| 3,564,202 | 2/1971 | Oppenheim | 219/400 |
| 3,732,066 | 5/1973 | Kipple et al. | 432/225 X |
| 3,816,705 | 6/1974 | Ebert | 219/521 |

*Primary Examiner*—Volodymyr Y. Mayewsky

[57] ABSTRACT

A device for heating a thermoplastic eyeglass frame having a rim and bridge portion and a temple portion, includes a housing having a pair of spaced infrared heat radiating surfaces mounted therein. The surfaces form an open-ended channel therebetween for receiving one of the eyeglass frame portions while permitting the other of said frame portions to remain out of range of the heat radiating surfaces. The heat radiating surfaces comprise spaced external surfaces on a heating block having a heating element embedded therein. The front radiating surface is larger than the rim and bridge portion of the frames while the rear radiating surface is smaller than the rim and bridge portion, for allowing the temple portions of the frames to extend beyond the rear radiating surface without exposure to that radiation. The rear radiating surface is small enough to fit between the temples of the smallest eyeglass frames in use but have their ends formed to radiate infrared rays in a diverging conformation to reach out and meet with the radiation of the larger front radiator, to thus accommodate radiation of and heating of any size eyeglass frames from the largest to the smallest in use. To further facilitate use of this device, support means located in front of and behind the open-ended channel support the eyeglass frames, either the rim or bridge portion, or the temple portion or any part thereof, in the chosen position for radiation by the operator of the device.

11 Claims, 12 Drawing Figures

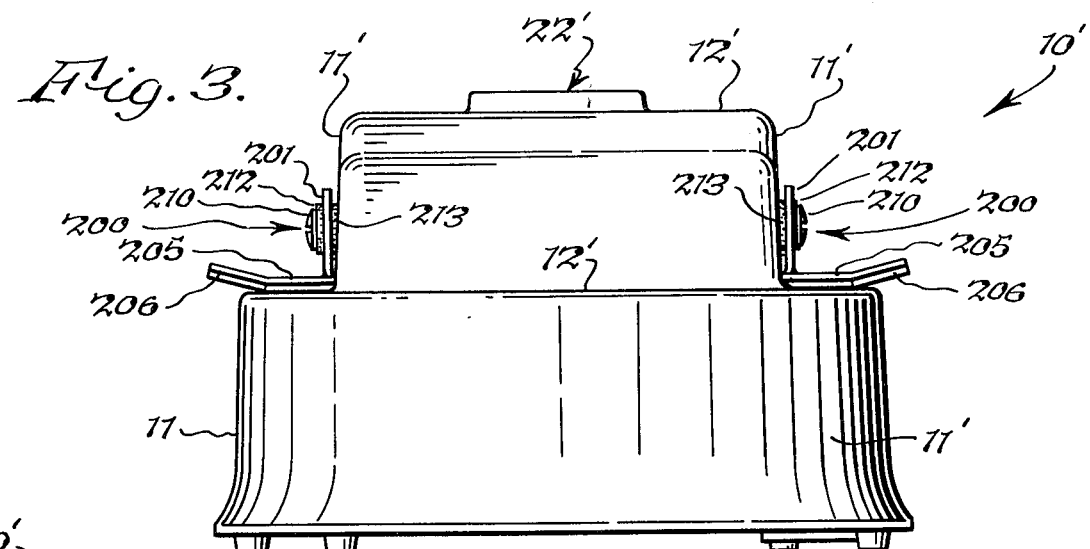
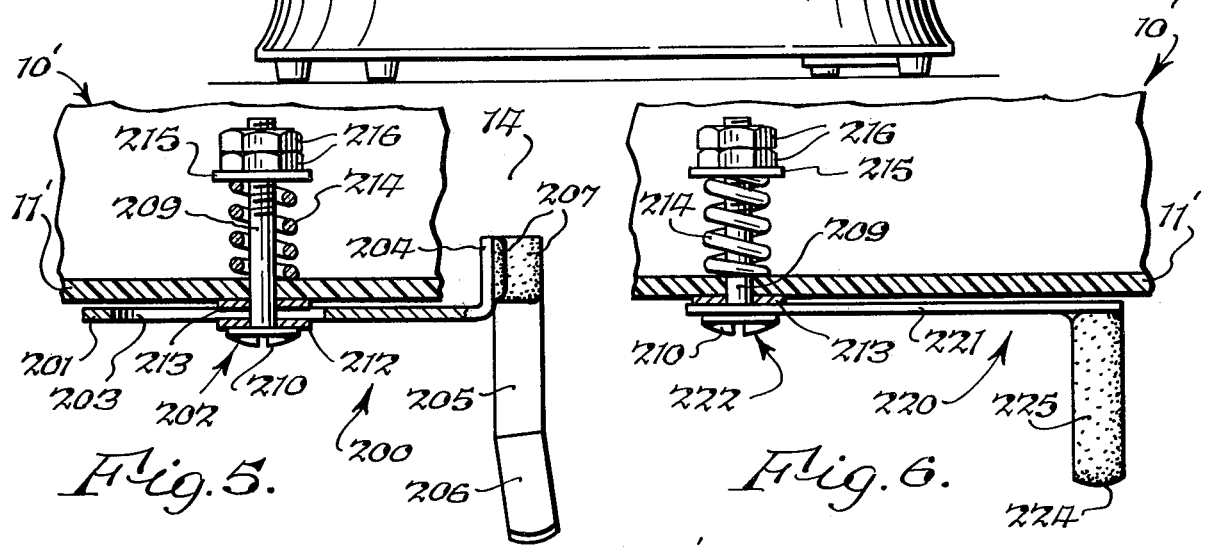
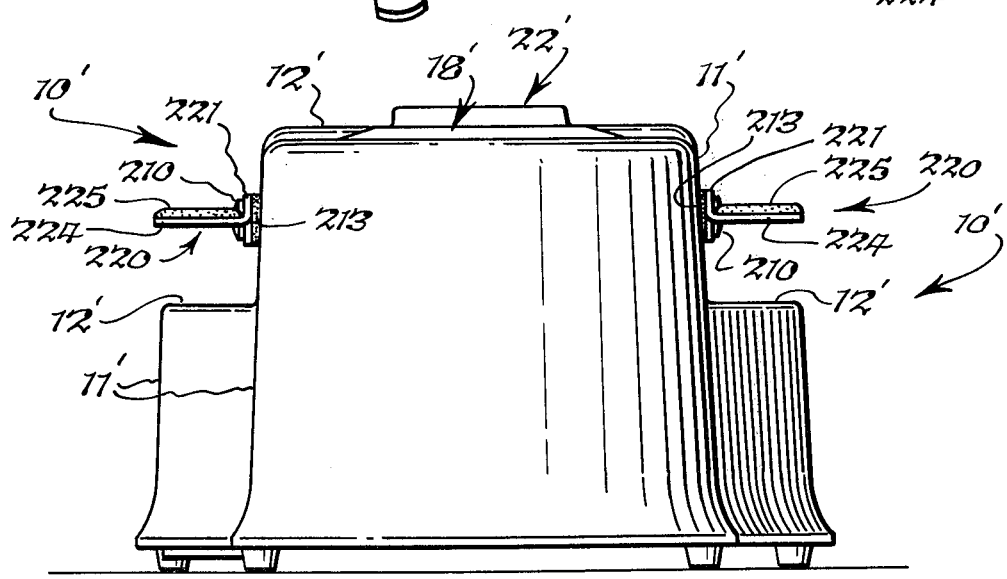

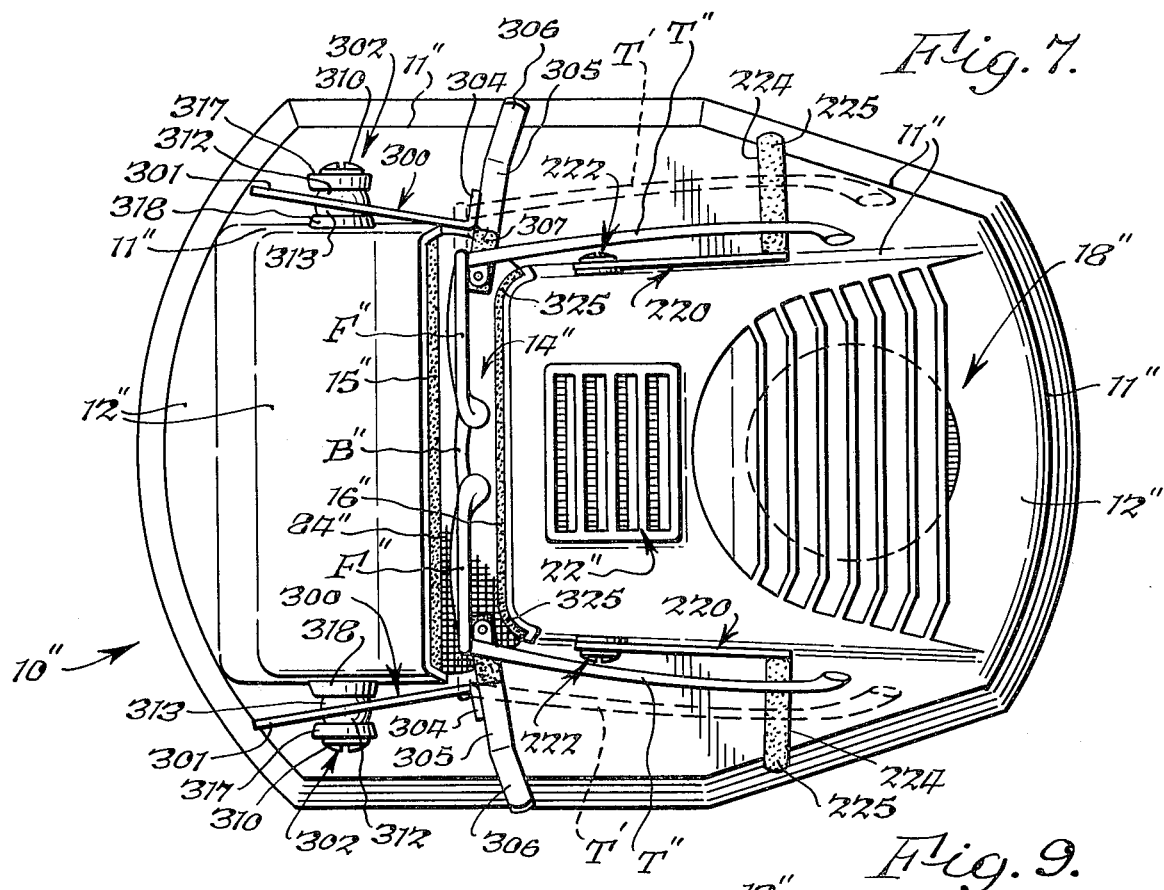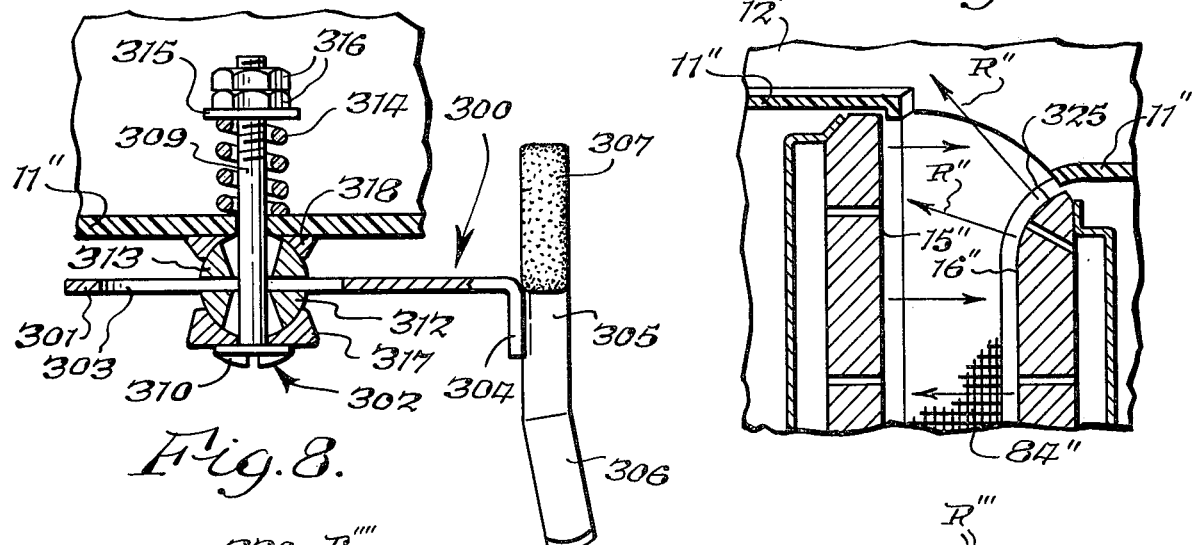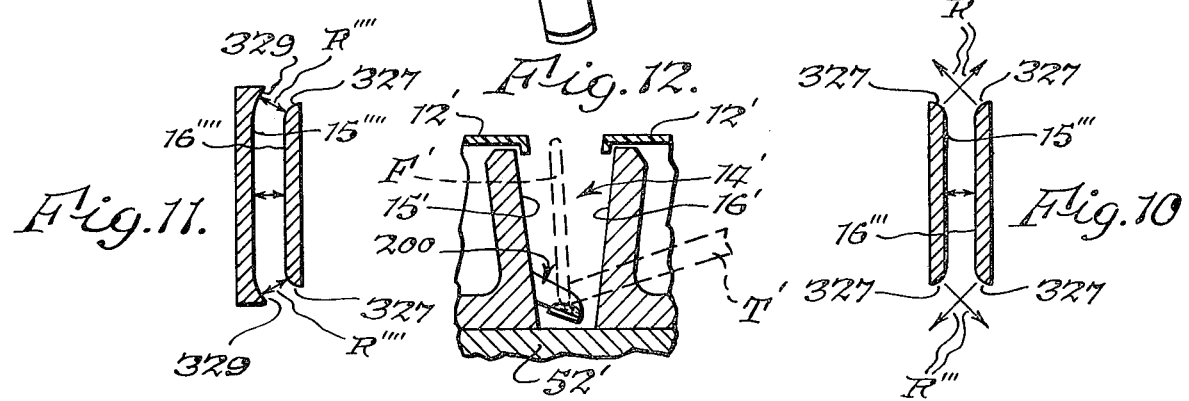

4,007,370

1

DEVICE FOR HEATING THERMOPLASTIC EYEGLASS FRAMES

BACKGROUND OF THE INVENTION

The present invention particularly relates to a machine used in the opthalmic profession for the fitting and/or glazing of lenses in eyeglass frames. These frames made of thermoplastic materials must be properly warmed to soften them to allow insertion of the lenses or to bend and form them to fit the face and head of the user. The warming of frames has been accomplished in many ways, such as by hot plates, hot air blowers, and infrared lamps, but none of these means were satisfactory regarding temperature and many times burned the plastic since they did not have temperature controlled heat and lacked adjustable holding means for support of the frames.

Therefore a prime object of this invention is to provide new and novel means for holding objects such as thermoplastic eyeglass frames in proper and precise position for proper exposure to heat for the softening of the whole portion or a smaller part of that portion.

More specifically it is an object of this invention to provide at least one pair of manipulatable supports movable in more than one plane to support the eyeglass frames in whatever position the operator chooses, for exposure to a heater.

Another object of the invention is to provide an additional pair of supports or a single support more removed from the heater to stabilize the position of the eyeglass frame while being held by the other supports.

A further object of the invention is to provide the additional support or supports with adjustment capability in at least one plane.

A still further object of this invention is to provide a pair of supports having universal adjustability as well as combined lineal movement.

Another object of this invention is the use of a larger and a smaller radiator, the larger for radiation of the outside of the eyeglass frame while the smaller radiates the inside of the frame.

Another object of this invention is to use a smaller and a larger radiator for the purpose of accommodating the smallest and the largest sizes of eyeglass frames.

Still another object of this invention is to provide the smaller radiator with lenticulated ends, or convex ends to project the infrared radiation of these ends out to the extremity of the larger radiator to match the extent of its radiation.

Another object is to provide both radiators with ends formed to diverge or extend the radiation from each of their four ends.

Another object is to provide a larger radiator with concave surfaces and a smaller radiator with convex surfaces, for receiving larger or smaller articles or for reception of curved or rounded frames.

SUMMARY

The present invention relates to a device for softening a plastic opthalmic frame comprising a housing, an infrared heat radiating surface on said housing, electrical heating means for exciting the radiating surface and means for positioning and holding the frame in selected positions for exposure to heat rays. More specifically the support means will readily adjust to hold a portion of the eyeglass frame in proper position for selective exposure to heat rays in a channel formed by the heat

2 radiating surface. One side of the channel is longer than the other to allow eyeglass frames to be placed in the channel for radiation from both sides while the temples, for example, extend away from the longer side and around and beyond the shorter side unexposed to the radiant heat. The shorter side has ends formed to extend their radiation to at least the same length as the longer side.

BRIEF DESCRIPTION OF THE DRAWINGS

The present invention, as well as further objects and features thereof, will be understood more clearly and fully from the following detailed description of the preferred embodiment, when read in conjunction with the accompanying drawings, in which:

FIG. 3 is an end view of the left end of FIG. 2.

FIG. 4 is another end view of the right end of FIG. 2.

FIG. 5 is an enlarged horizontal sectional view taken along line 5—5 in FIG. 2, of the eyeglass frame front support members.

FIG. 6 is a similar horizontal sectional view along line 6—6 in FIG. 2, of the temple rear support members.

FIG. 7 is a plan view similar to FIG. 1 but showing a modified heat radiator configuration for small to large opthalmic frames.

FIG. 8 is an enlarged horizontal section similar to FIG. 5 but of the modified embodiment of FIG. 7 having an universal action.

FIG. 9 is another enlarged horizontal section taken through the radiators and housing of the upper end of the plan view of FIG. 7.

FIG. 10 is a diagrammatic illustration of heat radiators showing both front and rear radiators having ends that divert the heat rays beyond their physical extremities.

FIG. 11 is another diagrammatic illustration of still another embodiment, the front radiator being concave and the rear radiator being convex.

FIG. 12 is a fragmentary vertical section along line 12—12 in FIG. 1 showing suspension of an opthalmic frame between the vertical side radiators and above the radiating bottom sides of the heating channel.

First there will be given a discussion of the operation of the machine to facilitate the detailed description of the various features illustrated.

GENERAL OPERATION

Figure 1:
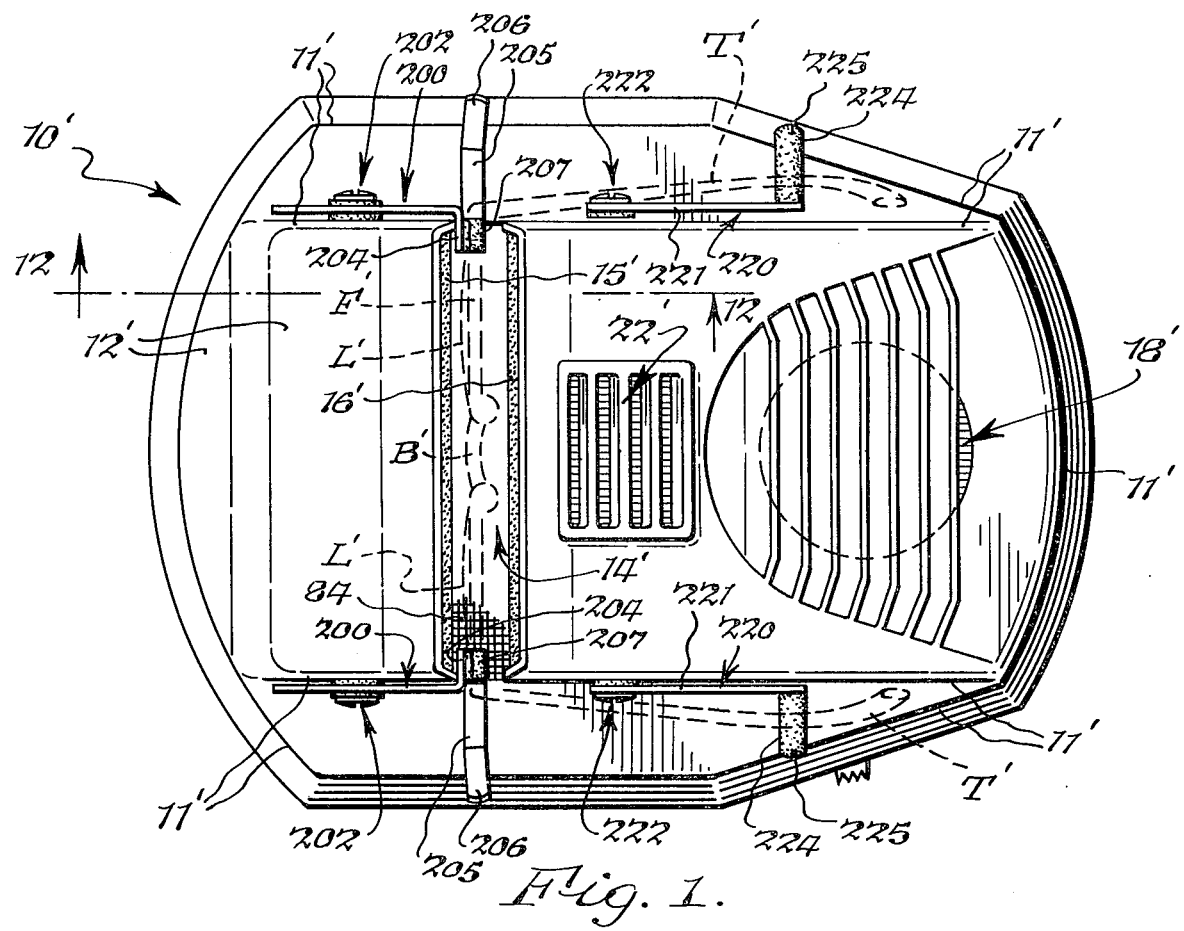
FIG. 1 is a top plan view of the device.
Figure 2:
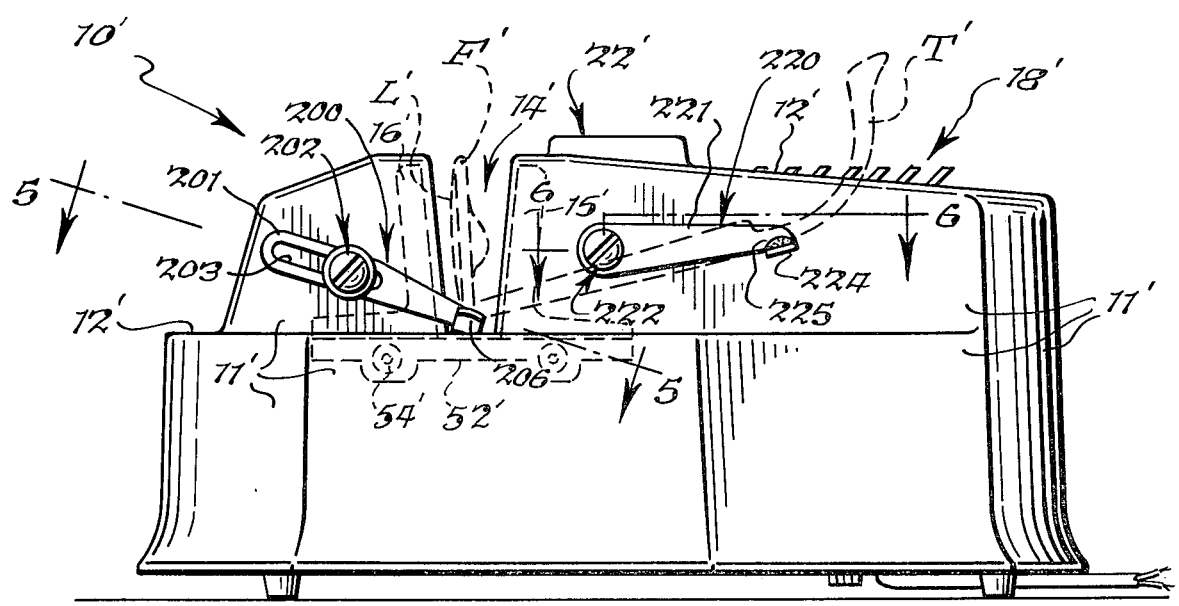
FIG. 2 is a side elevation of FIG. 1.

Generally the machine housing 10' illustrated in FIGS. 1 and 2 comprises side walls 11' which rise to a top wall 12' and then to a higher top wall 12' through which a channel 14' is provided. In this channel 14' which is open at both ends are infrared radiators 15' and 16' and this top wall 12' is further perforated with a louvered opening 22' through which a jet of cooling air is exhausted, while another louvered opening 18' provides an air intake for the housing. The specific construction and mode of operation of infrared radiators 15' and 16' is disclosed in detail in my copending application Ser. No. 207,086, filed Dec. 13, 1971, now U.S. Pat. No. 3,816,705, and this subject matter is incorporated here by reference, insofar as it is required for a better understanding of the present subject matter.

As will be seen in broken lines in these FIGS. 1 and 2 an opthalmic frame F' having a rim and bridge portion B' holding lenses L', lies in the open channel 14' with temple portions T' shown extending along the sides 11' toward the rear of the housing 10', i.e., the area where the intake 18' and the exhaust 22' are located, or to the right in FIGS. 1 and 2.

The rim and bridge portion B' of frame F' are supported in the channel 14' in spaced relation to each of the radiators 15' and 16' and the bottom 52' by a pair of adjustable fore, front support members 200, while the temples T' outside of the channel 14' and extending along the side walls 11' are supported by adjustable aft, rear support members 220. As seen in FIG. 12 it is clearly shown that the frame F' will be exposed to radiation from each of the side radiators 15' and 16' and the bottom 52' which are heated by electrical heating element 54', while thus being supported by the front support members 200, free and clear without touching these radiators 15', 16' and 52'. It will be appreciated a pad of material such as fiberglass fabric or mat 84 may be placed on surface 52', if desired, as shown in FIG. 1 and in copending application Ser. No. 207,086, now U.S. Pat. No. 3,816,705.

As seen in FIGS. 1 and 5 these front support members 200 are T-shaped in plan and are of left and right hand. Description of one will be deemed sufficient for both since otherwise they are identical to each other.

A main leg 201 of the front support 200 is disposed vertically parallel to either side 11' of the housing 10' and fore and aft of a horizontal friction pivot member 202, that passes through an elongated slot 203.

The farthest aft portion 204 is bent inwardly as seen in FIGS. 1 and 5 and has a horizontal leg or ledge 205, which extends outwardly away from the channel 14' ends. Its outermost extended end 206 forms a small finger-tip for gripping by the thumb and forefinger for manipulating and adjusting the position of the support portion 205 of the support member 200. The portions 204 and 205 are bedded with a cushion of silicon rubber 207 for non-marring support of a plastic eyeglass frame F'.

The friction pivot member 202 comprises a screw having a pan head 210 and a threaded shank 209. Next to the pan head 210 is a friction washer 212 which engages the vertical side of the leg 201. The screw shank 209 passes through the elongated slot 203 of the leg 201, through another friction washer 213 and then through a hole in the side wall 11' of the housing 10' wherein a compression spring 214, a washer 215 and a pair of lock nuts 216 are all threaded onto the shank 209 of the pivot member 202. Tension of the spring 214 is adjusted and the nuts 216 are then against each other into locking engagement.

This just described arrangement of the front support members 200 allows for pivotal vertical adjustment of the supporting parts 205 as well as for fore and aft adjustment at the same time. The combined movements allowed by the pivot 209 in the slot 203 while the tension of spring 214 urging the head 210 against friction washer 212, against leg 201, against friction washer 213, against fixed side wall 11' gives the necessary friction to stay in an adjusted position while supporting an opthalmic frame F' on either of its sides at the rim and bridge area in the channel 14' for precise position and exposure to the infrared radiation on both front and back sides by the radiators 15' and 16'.

Somewhat similar rear support members 220 are L-shaped as seen in plan in FIG. 1 and FIG. 6, these also being left and right hand like the front members 200.

The leg 221 is disposed parallel to the housing side wall 11' and is pivotally mounted thereon at its fore end by a friction pivot member identical to that just described for the pivot member 202 with the exception that the friction washer 212 need not be used. A horizontal leg or ledge 224 extends away from the side wall 11' and may have a cushion pad 225 of silicone rubber bedded onto its upper surface. The leg 224 is of sufficient length to act as a temple T' support as well as being a finger-grip for manipulation into proper support position. By the proper manipulation of supports 200, the attitude of frame portion F' may be adjusted relative to radiators 15' and 16'.

From the foregoing and study of FIGS. 1 through 6, it should now be clear that the front and rear supports 200 and 220 may be manipulated quickly and deftly to position opthalmic frames of many shapes and sizes into proper position and spacing for radiation of the rim and bridge portion B' by the radiators 15' and 16'.

Also through proper adjustment of the support members 200 and 220 the left or right rim portion may be given more or less exposure to the radiation in the channel 14' by raising one support higher than the other.

Further, the temple T' portions of the frames F', either left or right may be supported in the channel 14' by manipulation of all four of the supports 200 and 220.

It should also be noted that a single support 200 might be used combined with, and in conjunction with manual finger holding of the frames F' where a small area of the bridge B' or terminal ends of the temples T' are to be exposed to radiation.

These supports 200 and 220 facilitate the efficient use of a thermoplastic heating device as well as preventing the damaging and marring of the articles being heated in the device.

It would be possible in some instances to dispense with the rear support 220 with a fixed non-adjustable support in its stead.

In the form of the invention illustrated in FIGS. 7 through 11 the front radiator 15" to the left in FIG. 7 is longer than the rear radiator 16" to the right. Since the rear radiator 16" is in effect, the "inside" radiator, i.e., the radiator that would always be inside of the temples T' or T", must be small enough in length to allow the smallest size opthalmic frames F" to be placed with the "inside" radiator 16" between the temples T".

As will be seen in FIG. 7, a small size eyeglass frame T" is shown in full lines while a large size frame T' is shown in broken lines.

In this form of the invention the front support members 300 are not only articulate fore and aft, i.e., to the right and to the left in FIG. 7 and swing vertically up and down like the front support members 200, but they can also be swung horizontally in and out of the channel 14" to accommodate support of large or small size opthalmic frames.

These front supports, both left and right are comprised of a friction pivot member 302 that passes through an elongated slot 303 in its main leg 301 as seen in FIG. 8.

The farthest aft portion 304 is bent outwardly and has a horizontal leg or ledge 305 which extends inwardly and outwardly in line with the channel 14". Its outermost tip 306 forms a small handle for gripping by the thumb and forefinger for manipulating to adjust the position of the support portion 305 of the support member 300.

The innermost ends are provided with a silicone pad 307 for non-marring support of eye frames F' or F''.

The friction pivot member 302 comprises a screw having a pan head 310 and a threaded shank 309. Next to the pan head 310 is a washer 317 cavitated spherically to receive a half sphere friction washer 312 which engages the vertical side of the leg 301. The screw shank 309 passes through the elongated slot 303 through another half sphere friction washer 313, through a spherically cavitated washer 318 and then through a hole in the side wall 11'' of the housing 10'' where a compression spring 314, a washer 315 and a pair of lock nuts 316 are all threaded onto the shank 309 of the pivot member 302. As in the previous form of front support members 200, the tension of the spring 314 brought to bear on the leg 301 through the friction washers 312 and 313 and their companion mating washers 317 and 318 against the fixed housing wall 11'' provide an easily adjustable support assembly 300, universally movable in all directions, with built-in rigid support capability to support opthalmic frames or other articles.

The rear supports are identical to the previously described rear supports 220 and therefore carry identical numeral identification to that form.

It should now be clear that these forms of front support 300 and rear support 220 will readily accommodate either larger or small frames F', F'' and hold their rim and bridge portions as well as their temple portions as precisely adjusted by the operator in the channel 14'' for suitable, selective exposure to infrared radiation.

In the enlarged FIG. 9 it will be seen that the fore radiator 15'' is longer than the aft radiator 16'' and this radiator 16'' has a curved radiating surface 325 at both of its ends as shown in FIG. 7. This curvature is designed to cause diverging rays of infrared radiation R'' to reach out beyond the physical extent of the radiator 16''. Thus either a small or large size eyeglass frame F' or F'' will be radiated from both the front radiator 15'' and the rear radiator 16''.

In the modified radiators shown in FIG. 10, both radiators front and rear radiators 15''' and 16''' have ends 327 curved in such a manner that they radiate rays R''' beyond their physical endings to cross in an oblique manner, so that if desired both radiators may be made physically shorter than the physical length of the article such as the rim and bridge portion of a pair of eyeglass frames.

A further modified form of radiator is shown in FIG. 11 where the front radiator 15'''' having a concave configuration created by the concavely curved ends 329, while the rear radiator 16'''' is of convex configuration created by convexly curved ends 327, both having intermediate flat or straight areas in between. The arrows R'''' illustrate how the curved surfaces 329, 327 may if desired be made to radiate at each other in matched relationship, thus giving radiation to either smaller or larger sizes of eyeglass frames or frames of a curved nature.

From the foregoing it may be concluded that eyeglass frames or other objects may be efficiently and accurately mounted for heating or radiating in the device shown or any similar device until it has been suitably serviced by the device. Also the supporting means with the type of radiators shown make possible the servicing of a wide range of small and large articles by a single size machine.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A radiant type heater for heating an opthalmic frame having a frontal lens holding portion and a temple portion comprising a housing, electrical heating means and heat transfer means for transferring heat to first and second opposed heat radiating surfaces on said housing for receiving said frontal lens holding portion therebetween support means on said housing to hold said frontal lens holding portion of said opthalmic frame between said first and second heat radiating surfaces and in spaced relation thereto, said first heat radiating surface having opposite extreme outer ends with at least one extreme outer end being of a configuration to extend radiation beyond said one extreme outer end to meet radiation from said second heat radiating surface, said first heat radiating surface being of a dimension to permit said temple portions to be placed outside of said extreme outer ends of said first heat radiating surface and to also permit a portion of said frontal lens holding portion to be placed outside of said one extreme outer end of said first heat radiating surface, whereby said one extreme outer end will heat said portion of said frontal lens holding portion which extends beyond said one extreme outer end of said first radiating surface.

2. A radiant type heater as set forth in claim 1 wherein said first radiating surface is shorter than said second radiating surface.

3. A radiant type heater as set forth in claim 1 wherein said second radiating surface has a concave radiating surface and said first radiating surface has a convex radiating surface, with said convex and concave surfaces facing each other to complement the radiation of each other on said article.

4. A radiant type heater as set forth in claim 1 wherein said first and second radiating surface are of equal length, each having at least one extreme outer end portion formed to extend radiation beyond said extreme outer end portions, said radiation from each meeting and crossing in an oblique manner.

5. A radiant type heater comprising a housing, first and second opposed heat radiating surfaces on said housing, thermal insulation support means on said housing to hold a thermoplastic article between said first and second opposed heat radiating surfaces and in spaced relation thereto, electrical heating means and heat transfer means for transferring heat from said electrical heating means to said opposed heat radiating surfaces, said first heat radiating surface having at least one end formed to extend radiation beyond said end to meet radiation from said second heat radiating surface, said support means including a handle portion, a ledge portion having thermal insulation supporting means, a main leg portion and a horizontal pivot member fastened to said housing, said main leg portion having a slot through which said pivot member passes, allowing pivotal and longitudinal articulation of said ledge portion, and said pivot member having friction means spring-biased to retain said support means in any position of adjustment.

6. A radiant type heater as set forth in claim 5 wherein said support means include a second additional support means for supporting other portions of said article beyond and outside of said opposed radiating surfaces comprising a main leg, a ledge portion and a horizontal friction pivot fastened to said housing to retain said second support means in any position of adjustment.

7. A radiant type heater for heating an opthalmic frame having a frontal lens holding portion and temple portion comprising a housing, electrical heating means on said housing, spaced thermal insulation supporting means for supporting spaced portions of said frontal portion in spaced relationship to said heating means, adjusting means for adjusting the position of said spaced supporting means relative to said heating means, said heating means comprising radiator means having spaced opposed heat radiating surfaces, electrical heating means and heat transfer means for transferring heat from said electrical heating means to said opposed heat radiating surfaces, and wherein said adjusting means permit movement of said supporting means toward and away from said spaced heat radiating surfaces, and parallel thereto, in both a horizontal and vertical direction.

8. A radiant type heater for heating an opthalmic frame having a frontal lens holding portion and temple portion comprising a housing, electrical heating means on said housing, spaced thermal insulation supporting means for supporting spaced portions of said frontal portion in spaced relationship to said heating means, said heating means comprising radiator means having spaced opposed heat radiating surfaces, electrical heating means and heat transfer means for transferring heat from said electrical heating means to said opposed heat radiating surfaces, a bottom wall between said heat radiating surfaces, and wherein said spaced supporting means support said frontal lens holding portion in spaced relationship to said spaced heat radiating surfaces and said bottom wall.

9. A radiant type heater for heating an opthalmic frame having a frontal lens holding portion and temple portion comprising a housing, opposed heat radiating surfaces on said housing, spaced thermal insulation supporting means for supporting spaced portions of said frontal portion in spaced relationship to said opposed heat radiating surfaces, adjusting means for adjusting the position of said spaced supporting means relative to said opposed heat radiating surfaces, electrical heating means and heat transfer means for transferring heat from said electrical heating means to said opposed heat radiating surfaces, and second adjustable supporting means on said housing for supporting said temple portions to thereby vary the attitude of said frontal portion relative to said opposed heat radiating surfaces.

10. A radiant type heater comprising a housing, first and second opposed heat radiating surfaces on said housing, thermal insulation support means on said housing to hold a thermoplastic article between said first and second heat radiating surfaces and in spaced relation thereto, electrical heating means, heat transfer means for transferring heat from said electrical heating means to said opposed heat radiating surfaces, said thermal insulation support means including a handle portion, a ledge portion, a main leg portion and a horizontal pivot member mounted in said housing, said main leg portion having a slot through which said pivot member passes, said pivot member having ball and socket friction means allowing spherical and longitudinal articulation of said ledge and handle portion, to support any article in any position of adjustment, and said thermal insulation support means including an insulated area for engaging said thermoplastic article.

11. A radiant type heater as set forth in claim 10 wherein said first heat radiating surface has at least one end formed to extend radiation beyond said end to meet radiation from said second heat radiating surface.

* * * * *